United States Patent [19]

Haas et al.

[11] Patent Number: 5,781,292
[45] Date of Patent: Jul. 14, 1998

[54] SHORT PATH SCANNING INTERFEROMETER

[75] Inventors: Edwin G. Haas, Sayville; Theodore W. Hilgeman, Centerport; Robert E. Ryan, Levittown, all of N.Y.

[73] Assignee: Northrop Grumman Corporation, Los Angeles, Calif.

[21] Appl. No.: 919,837

[22] Filed: Aug. 28, 1997

Related U.S. Application Data

[63] Continuation-in-part of Ser. No. 473,059, Jun. 7, 1995.
[51] Int. Cl.$^6$ .................................................... G01B 9/02
[52] U.S. Cl. ....................................... 356/345; 356/352
[58] Field of Search ........................... 356/352, 345; 359/871, 881

[56] References Cited

U.S. PATENT DOCUMENTS 3,229,224 1/1966 Waly et al. ............................. 356/352
3,814,507 6/1974 Osborn et al. ......................... 359/871

Primary Examiner—Frank G. Font
Assistant Examiner—Amanda Merlino
Attorney, Agent, or Firm—Terry J. Anderson; Karl J. Hoch, Jr.

[57] ABSTRACT

A short path scanning interferometer comprising a base forming an interior, and first and second optical members located in the interior of the base. The interferometer further comprises a first retainer assembly connecting the first optical member to the base, translation means for moving the second optical member relative the first optical member to vary the distance between the first and second optical members, and a second retainer assembly connecting the second optical member to the translation means. The preferred mechanical configuration and design features of the interferometer produce a very durable instrument that can rapidly scan and accurately filter light across a wide bandwidth including short path scanning at low orders. This uniquely designed instrument combines high speed switching, high resolution, wide bandwidth, and adjustable damping capabilities in a durable flight capable instrument.

23 Claims, 7 Drawing Sheets

SHORT PATH SCANNING INTERFEROMETER

CROSS REFERENCE TO RELATED APPLICATION

This application is a continuation-in-part of application 08/473,059 pending filed on Jun. 7, 1995.

BACKGROUND OF THE INVENTION

1. Field of the Invention

The field of art to which this invention relates is interferometers. Specifically, this invention relates to interferometers capable of short path scanning.

2. Description of the Related Art

Interferometers are very useful tools. For example, interferometers may be used to take a wide variety of measurements ranging, for example, from determining the separation of binary stars, to determining the shape of a surface with a precision of less than 25 nanometers. Interferometers are also commonly used to analyze gases, and specifically, to determine the contents of a quantity of gas.

In an interferometer, two or more light beams, which may be from the same source or from different sources, interfere with each other to produce an interference or fringe pattern, consisting of alternating light and dark areas. The light areas are the result of the input light beams constructively interfering with each other, and the dark areas of the fringe pattern are the result of the wave patterns of the input light beams canceling each other. The distance between adjacent dark areas of the fringe pattern can be used to calculate the difference between the paths traversed by the different input beams; and this, in turn, can be used to calculate the parameter that the interferometer is being used to measure.

When an interferometer is used to analyze a gas sample, the difference between the optical paths of the input beams is varied in a controlled manner. At one or more specific values for this difference, the interferometer produces an interference pattern. Each of these values is the result of the presence of a specific, associate gaseous element; and thus, an interference pattern at a specific value for the difference in optical paths, indicates the presence of the associated element in the gas sample.

A Fabry-Perot interferometer is a particular type of interferometer having two parallel, partially reflective and partially transmissive optical surfaces. Input light is multiply reflected between the two optical surfaces, and the output of the interferometer is, typically, a circular fringe pattern. This type of interferometer is often used to analyze light from a diffuse source. When the optical surfaces are spaced apart certain distances relating to the wavelengths of the light waves in the diffuse light source, the interferometer produces well defined fringe patterns.

In the original Fabry-Perot interferometer, two parallel mirrors were mechanically moved apart to obtain visible light interference patterns. The original Fabry-Perot design remained relatively unchanged until piezo-electric translators were introduced and incorporated into interferometer designs. These piezo-electric translators allowed much more accurately controlled movement of one mirrored optical flat with respect to the other. However, the inability of these piezo-electric translators to withstand shear, tensile or bending forces limited scanning interferometers to laboratory operating conditions or field measurements taken under stable conditions.

Interferometers have many potential airborne surveillance applications. For instance, interferometers may be employed on aircraft to analyze smoke stack emissions for the presence of pollutants or other gaseous emissions. In such applications, it is important that the interferometer have the ability to test for the presence of a large number of different gaseous compositions. In order to do this, it is important that the interferometer have the capability to switch quickly from one band to another as well as to scan quickly across specific bandwidths. With a Fabry-Perot interferometer of the type discussed above, the interferometer is switched between bands by changing the distance between the optical surfaces from one specific value to a second specific value, and the interferometer is scanned across a bandwidth by moving one or both of the optical surfaces so that the distance between those surfaces gradually varies across a range of values. Past instruments, generally, do not have the ability to scan and operate over wide bandwidths, which has become increasingly important for airborne surveillance applications.

In addition, in the operation of an interferometer, it is important that the optical surfaces be located very precisely. Generally, as mentioned above, prior art instruments have been designed for use in laboratories or in other well controlled environments, and these instruments have not been designed to withstand the rigors of aircraft or spacecraft maneuvers, landings and take-offs.

FIG. 1 shows the theoretical transmission curve for a Fabry-Perot interferometer with moderately highly reflecting mirrors, i.e., the finesse is 60 (finesse is approximately the number of bounces the light path covers inside the cavity.) The cavity is the region between the mirrored plates of the interferometer, defined by a spacing distance (d). The horizontal axis of the curve is in units of wavelength ($\lambda$) divided by twice the spacing distance ($2d$). The transmission peaks of the transmission curve are identified by their "order" number. The transmission axis is shown from 0 to 1, with 1 indicating 100% of the incident light being transmitted.

The longest wavelength transmitted occurs at first order, shown as reference numeral 2, where d equals one half of a wavelength. Second order is where d equals a full wavelength, shown as reference numeral 4. Third order is where d equals three halves of a wavelength, Shown as reference numeral 6.

The distance between the transmission peaks of two consecutive "orders" is known as the free spectral range. At low orders, (i.e., first, second, and third orders) the free spectral range is greatest. At high orders, shown as the region designated by reference numeral 8, the peaks rapidly become closely spaced. Therefore the free spectral range is very small in region 8.

Prior art interferometers such as those disclosed in U.S. Pat. No. 3,229,224 to Waly et al. and U.S. Pat. No. 3,814,507 to Osborn et al. have typically operated in high orders, using large plate spacings (d). This is referred to as long path scanning. These large plate spacings are useful for tuning narrow source lines, such as laser light, but not for general spectroscopy. The reason is that the small free spectral range associated with large plate spacing (d) limits the operation to a narrow spectral region, which requires an order sorting filter to sort out the adjacent peaks.

SUMMARY OF THE INVENTION

An object of the present invention is to improve optical interferometers.

Another object of the present invention is to provide an optical interferometer capable of short path scanning at high orders.

Another object of the present invention is to provide an optical interferometer capable of withstanding the rigors of aircraft or spacecraft maneuvers, landings and take-offs.

A further object of this invention is to provide an optical interferometer that combines high speed switching, high resolution, wide bandwidth, and adjustable damping capabilities in a durable flight capable instrument.

These and other objectives are attained with and interferometer comprising a base forming an interior, and first and second optical members located in the interior of the base. The interferometer further comprises a first retainer assembly connecting the first optical member to the base, translation means for moving the second optical member relative the first optical member to vary the distance between the first and second optical members, and a second retainer assembly connecting the second optical member to the translation means.

As described in greater detail below, the preferred mechanical configuration and optical and electromechanical features of the short path scanning interferometer produce a durable instrument that allows operation at low orders (i.e., small d, and large free spectral range) where there is little interference from adjacent order peaks.

This uniquely designed instrument combines short path (i.e., high order) scanning, high speed switching, high resolution, wide bandwidth, and adjustable damping capabilities in a durable flight capable instrument.

Further benefits and advantages of the invention will become apparent from a consideration of the following detailed description given with reference to the accompanying drawings, which specify and show preferred embodiments of the invention.

DETAILED DESCRIPTION OF THE PREFERRED EMBODIMENTS

Figure 1:
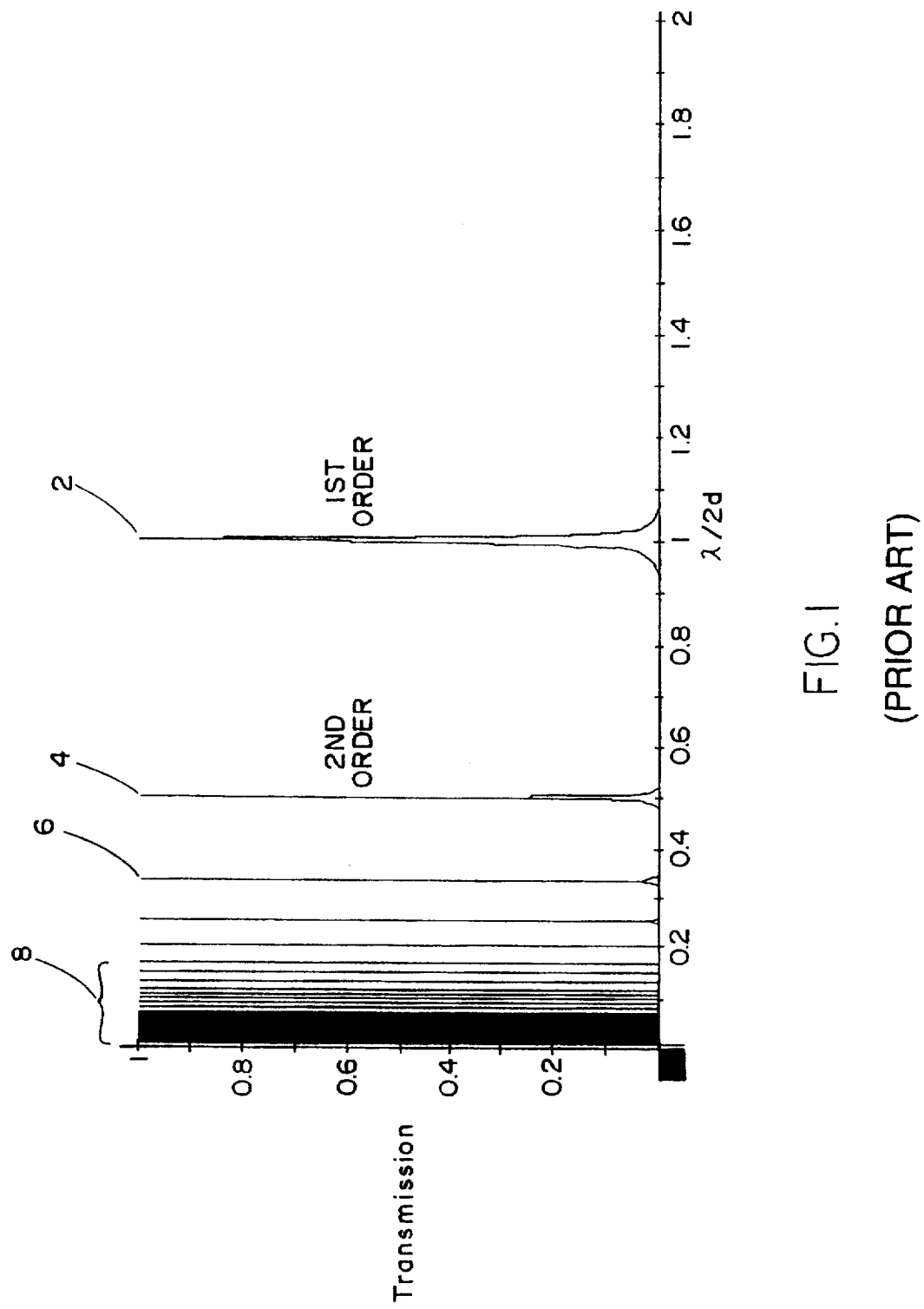
FIG. 1 illustrates a theoretical transmission curve for a Fabry-Perot interferometer.
Figure 2:
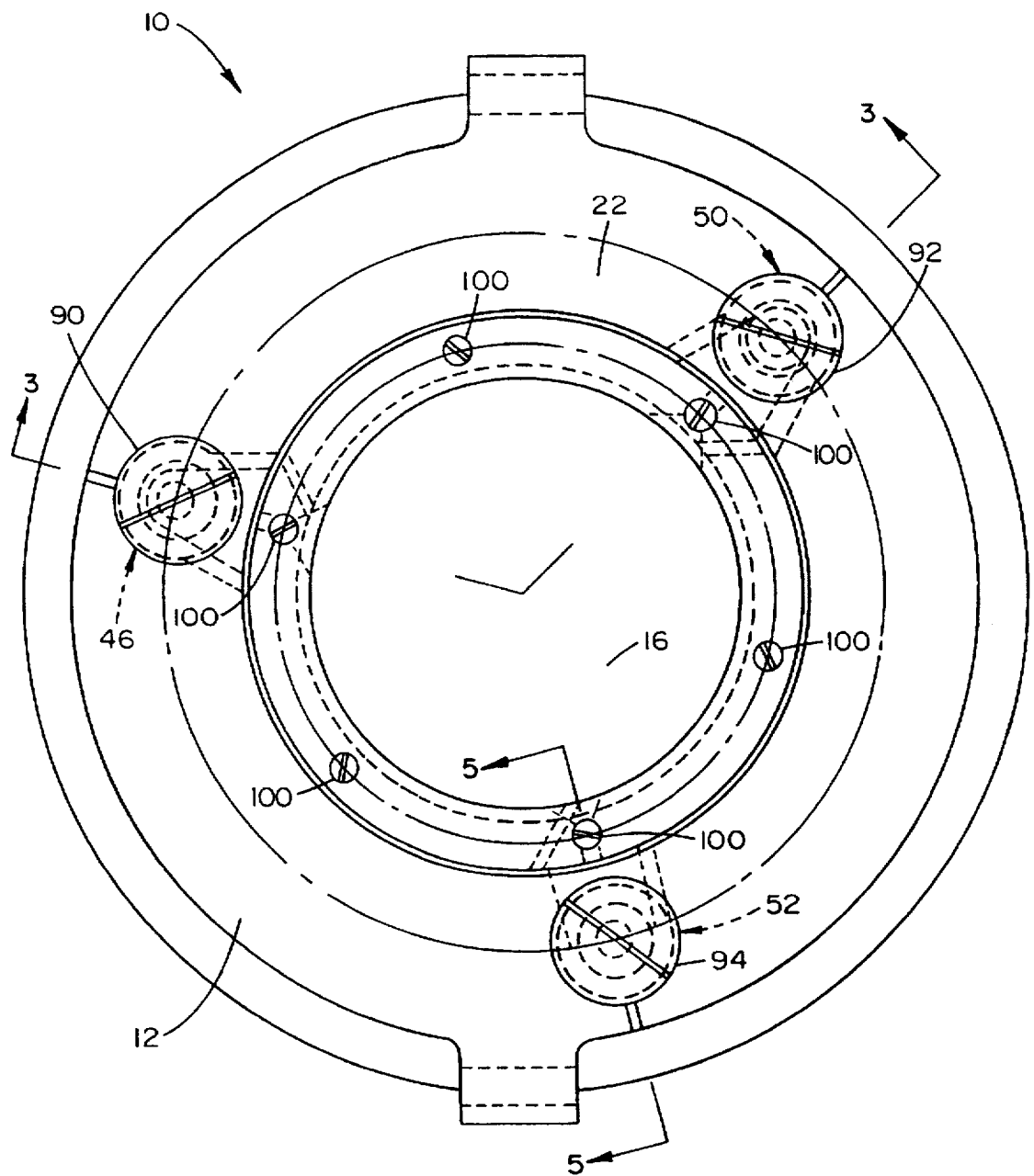
FIG. 2 is a top view of an interferometer embodying the present invention.
Figure 3A:
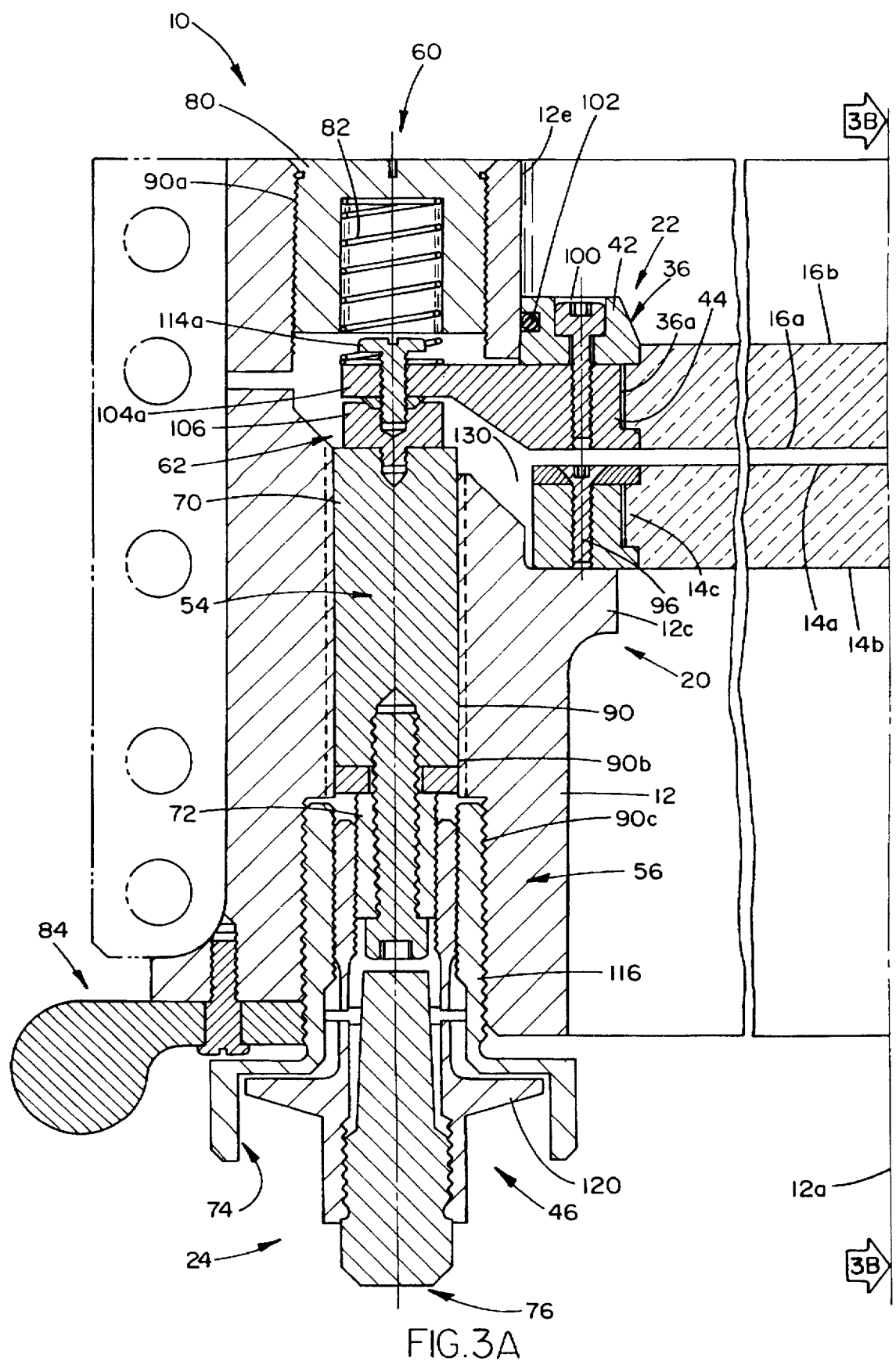
FIGS. 3A and 3B together form a cross-sectional view of the interferometer of FIG. 2, taken along line 3—3 thereof.
Figure 3B:
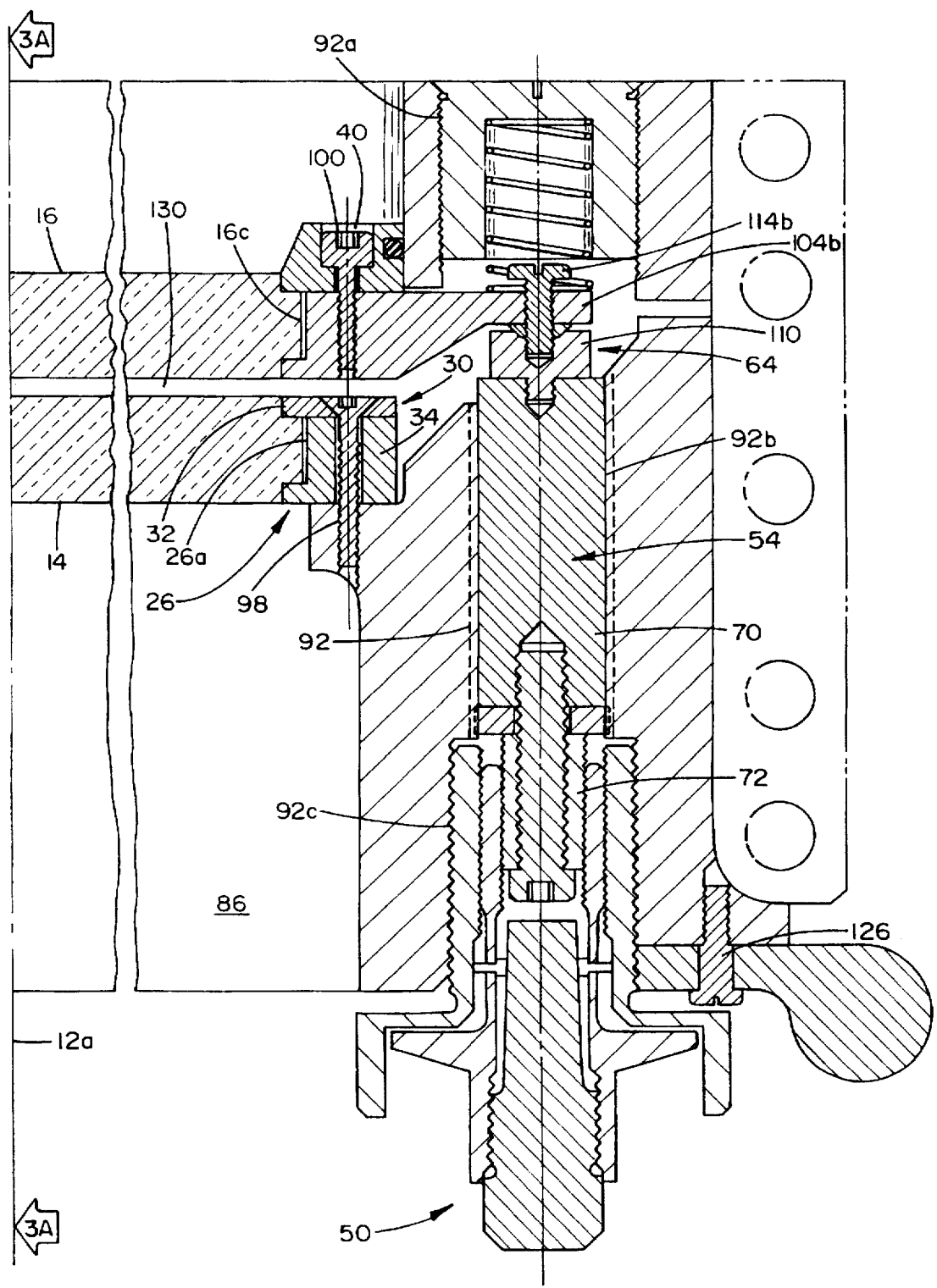

FIGS. 2 and 3 show interferometer 10 generally comprising base or housing 12, first and second optical members 14 and 16, first and second retainer assemblies 20 and 22, and translation means 24. Preferably, first retainer assembly 20 includes frame 26 and connecting means 30, and frame 26 includes upper and lower frame sections 32 and 34. Second retainer assembly 22 includes frame 36 and connecting means 40, and this frame also includes upper and lower frame members 42 and 44.

In addition, preferably translation means 24 includes a plurality of translation assemblies 46, 50 and 52; and each of these assemblies 46, 50 and 52 includes translation member 54, displacement subassembly 56, biasing subassembly 60 and a mounting subassembly 62, 64 or 66. More specifically, in each of these assemblies 46, 50 and 52, translation member 54 includes upper cylinder 70 and lower cylinder 72, displacement subassembly 56 includes coarse adjustment means 74 and fine adjustment means 76, and biasing subassembly 60 includes retaining plug 80 and coil spring 82. Preferably, interferometer 10 also includes locking means 84 for coarse adjustment means 74.

Generally, base 12 of interferometer 10 forms interior 86, first and second optical members 14 and 16 are located in this interior, and these optical members define planar, parallel optical surfaces 14a and 16a respectively. First retainer assembly 20 connects first optical member 14 to base 12, and second retainer assembly 22 connects second optical member 16 to translation means 24. Translation means 24 is provided to move second optical member 16 relative to first optical member 14, to vary the distance between optical surfaces 14a and 16a.

In operation, light from a source is directed through interior 86 of base 12; and specifically, the light is directed through an input end of the base and through optical surfaces 14a and 16a. This light is multiply reflected between optical surfaces 14a and 16a, and the output light is transmitted through the output side of the base 12. If the distance between optical surfaces 14a and 16a is an integer multiple of the wavelength of one of the component beams of the light transmitted through the interferometer, then the output light has a fringe pattern including alternating light and dark areas. Suitable means (not shown) may be used to sense the output light from interferometer 10 to determine whether that output light has a fringe pattern.

In this operation, translation means 24 may be used to change the distance between optical members 14 and 16. In particular, the distance between surfaces 14a and 16a can be changed, or switched, from one specific distance to another, to test the input light for a particular component having a specific wavelength. Also, the distance between surfaces 14a and 16a can be varied gradually over a given range in order to scan the input light for a component having a wavelength within a corresponding wavelength range.

With the preferred embodiment of the interferometer 10 illustrated in the drawings, base 12 has a hollow, tubular shape, and the base forms interior 86 and defines central axis 12a. Preferably, base 12 forms a plurality of axial through bores 90, 92 and 94 that are equally spaced around the circumference of the base; and each of these through bores includes an upper portion, intermediate portion and a lower portion. In FIG. 3, the upper, intermediate and lower portions of through bore 90 are referenced, respectively, at 90a, 90b and 90c, and the upper, intermediate and lower portions of through bore 92 are referenced, respectively, at 92a, 92b and 92c. In addition, as particularly shown in FIG. 2, preferably base 12 is split in half, into two sections, along a diameter of the base to facilitate assembling and disassembling the base. Base 12 may be formed from any suitable material; and preferably, the base is formed from a high strength material that, at least at temperatures around room temperature, approximately 23° C., has a very low coefficient of thermal expansion. For example, base 12 may be made from material sold under the trademark Invar. The base shown in the referenced Figures does not have excess material removed for lightening (weight reduction), however, one skilled in the art can appreciated that for aircraft/spacecraft operation weight would preferably be minimized.

Optical members 14 and 16 are substantially identical to each other, and each optical member has the general shape of a solid disc, including substantially planar top and bottom surfaces. With particular reference to FIG. 3, the top and bottoms surfaces of optical member 14 are referenced at 14a and 14b, respectively, and the bottom and top surfaces of optical member 16 are referenced at 16a and 16b, respectively. Each of the optical members 14 and 16 also includes an annular flange or edge portion 14c, 16c used, in a manner more fully discussed below, to hold the optical member inside base 12. Preferably, in interferometer 10, optical members 14 and 16 and their respective retaining assemblies 20 and 22 are peripherally surrounded by the rigid housing 12.

Optical members 14 and 16 may be made from any suitable material. For example, members 14 and 16 may be made from fused silica and surfaces 14a and 16a may be covered with a reflective, but semi-transparent thin film coating (not shown). In addition, capacitive readout strips (not shown), composed of sputter coated gold, for example, are preferably deposited on facing surfaces 14a and 16a of optical members 14 and 16. The capacitance of the opposed capacitive strips is a function of the distance between these strips and, hence, the distance between members 14 and 16; and these capacitance strips may be used, in a known manner, to indicate the distance between optical members 14 and 16. With these capacitative strips, or other suitable means, the gap between optical members 14 and 16 can be pre-set and controlled as desired.

Figure 4:
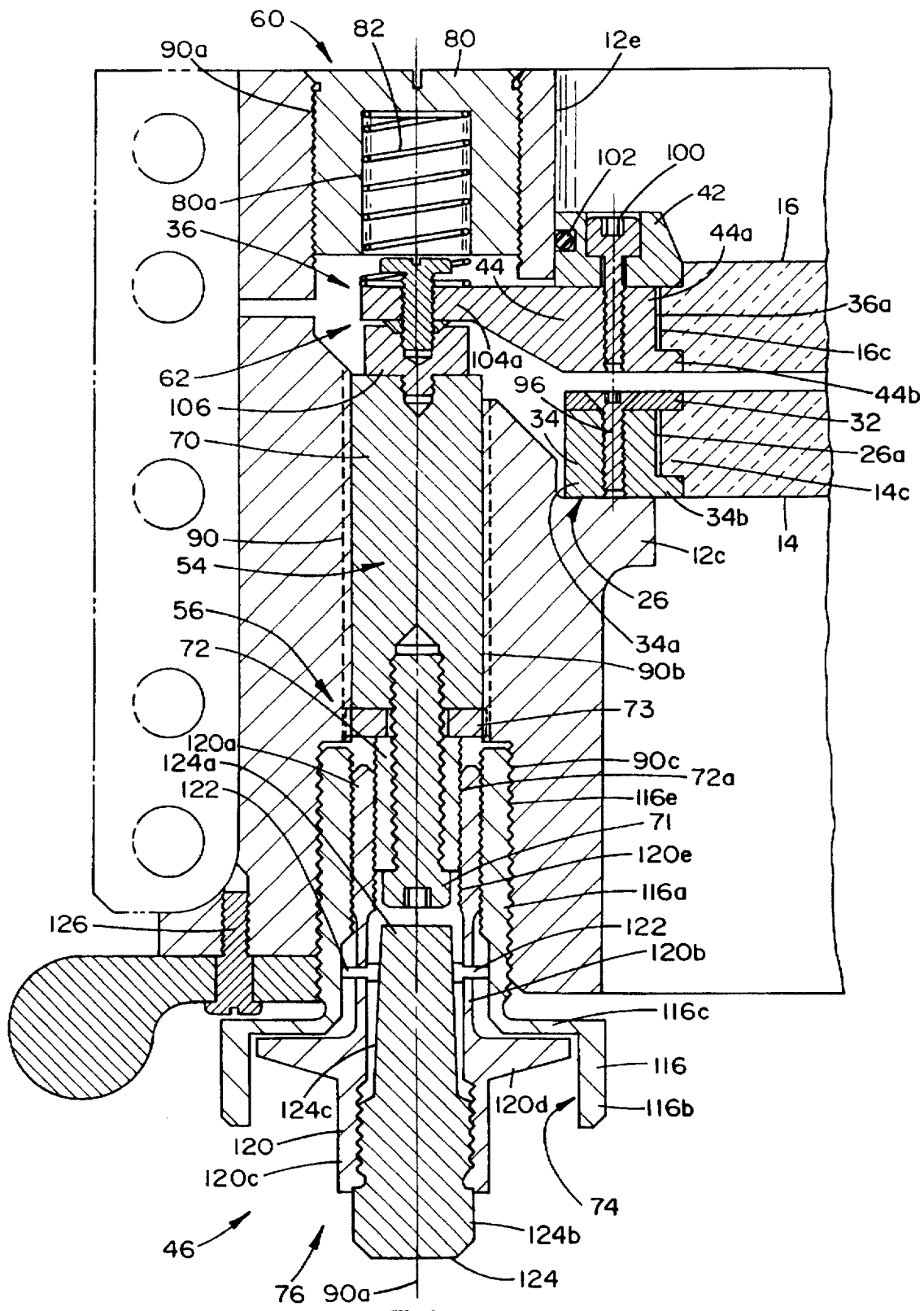
FIG. 4 is an enlarged, cross-sectional view of a portion of FIG. 3.

First retainer assembly 20 connects first optical member 14 to base 12, and preferably retainer assembly 20 holds optical member 14 securely in a substantially fixed position relative to the base. With particular reference to FIGS. 3 and 4, base 12 forms an inside annular shoulder portion 12c, frame 26 is mounted on and securely connected to that shoulder portion 12c, and optical member 14 is, in turn, securely connected to frame member 26. More specifically, frame 26 defines an annular grove 26a and optical member 14, specifically outside annular flange portion 14c, extends into and is securely held in groove 26a.

With the embodiment of frame 26 shown in the drawings, lower frame section 34 includes a main, peripheral portion 34a extending around interior 86 of base 12, and a lower shoulder portion 34b connected to and extending radially inward from main portion 34a. In addition, upper frame section 32 is mounted on main portion 34b of frame section 34, extends radially inward therefrom and projects over shoulder portion 34b of lower frame section 34. In this way, upper frame section 32 and shoulder portion 34b of lower frame section 34 form groove 26a, and annular flange 14c of optical member 14 is securely clamped between upper frame section 32 and shoulder portion 34b.

Frame 26 may have any appropriate size and shape. With the preferred embodiment of interferometer 10, frame 26 has a generally annular or ring shape, with upper frame section 32 forming a bezel that holds optical member 14 in the frame. Any suitable means may be employed to connect upper frame section 32 to lower frame section 34 and to connect frame 26 to base 12. Preferably, a first set of retaining screws 96 fasten frame sections 32 and 34 together, and a second set of through screws 98 extend through frame sections 32 and 34 and into base 12, connection frame 26 to the base. For example, each of the sets of screws 96 and 98 may comprise three screws, located 120° apart, and the screw sets 96 and 98 may be offset 60° relative to each other. Moreover, preferably, frame 26 sits against shoulder portion 12c of base 12 in a tight pressure fit thereagainst, forming an effective gas seal between shoulder portion 12c and frame 26. Either a gasket or sealant (neither are shown) may be used at the interface between shoulder portion 12c and frame 26.

Second retainer assembly 22 connects second optical member 16 to translation means 24; and, as mentioned above, second retainer assembly 22 preferably includes frame 36 and connecting means 40. Frame 36 defines an inside annular groove 36a and optical member 16, specifically annular flange 16c thereof, extends into and is securely held in groove 36a. Preferably, lower frame section 44 includes a main peripheral portion 44a extending around the interior of base 12, and a lower shoulder portion 44b connected to and extending radially inward from main portion 44a. Also, upper frame section 42 is mounted on main portion 44a of frame section 44, extends radially inward therefrom and projects over shoulder portion 44b of lower frame section 44. Upper frame section 42 and shoulder portion 44b of lower frame section 44 form groove 36a, and annular flange 16c of optical member 16 is securely clamped between upper frame section 42 and shoulder portion 44b.

Frame 36 also may have any suitable size and shape; and preferably, frame 36 has a generally annular or ring shape, with upper frame section 42 forming a bezel holding optical member 16 in the frame. Preferably, frame 36 engages optical member 14 completely or substantially completely around the complete perimeter of the optical plate. This 360° constraint of the optical element facilitates moving the optical element without causing strain-induce optical aberrations. Further, frame sections 42 and 44 may be connected together in any appropriate manner, and for instance, six bolts 100, spaced apart 60° around the frame, may be used to connect frame section 42 to frame section 44. In addition, preferably, upper frame section 42 is located closely adjacent the inside surface 12e of base 12; and a seal 102 is captured between frame section 42 and surface 12e, forming a gas tight seal therebetween.

The unique design of the first and second retainer assemblies 20, 22 permit the first and second optical surfaces 14a, 16a to come close enough to actually contact each other thereby permitting desired short path scanning. Furthermore, the retainer assemblies 20,22 permit the contact of the optical surfaces 14a, 16a while firmly holding the optical members 14, 16 in place.

Frame 36 is connected to translation assemblies 46, 50 and 52 by being mounted on mounting subassemblies 62, 64, 66 and captured between those subassemblies and biasing subassemblies 60 of the translation assemblies. More specifically, frame 36 also includes a series of projections or tabs 104a, 104b and 104c that extend outwardly into engagement with translation assemblies 46, 50 and 52, between mounting subassemblies 62, 64 and 66 and biasing subassemblies 60. Preferably, tabs 104a, 104b and 104c are integral with and extend outward from lower frame section 44, and each of these tabs engages a respective one of the translation assemblies 46, 50 and 52.

As discussed above, translation means 24 is provided to move optical member 16 relative to optical member 14, and more specifically, to move optical member 16 upwards and downwards in base 12. The preferred embodiment of translation means 24 shown in the drawings includes three translation assemblies 46, 50 and 52, spaced 120° apart around base 12. Translation assemblies 46, 50 and 52 are generally similar to each other, and the principle difference among these translation assemblies is that the mounting assemblies 62, 64 and 66 are different. Thus, one of the translations assemblies and all three of the mounting assemblies will be described herein in detail.

With particular reference to FIG. 4, translation member 54 of translation assembly 46 is supported for upward and downward sliding movement relative to base 12, and specifically, member 54 is supported for upward and downward sliding movement in bore 90 of the base. Preferably, the translation member 54 includes a translator base 73, an externally threaded lower cylinder 72, an upper cylinder 70 comprising a piezo-electric, magnetostrictive or other remotely controlled micro-positioner, and a retaining screw 71 which locks components 70, 72 and 73 together concentrically in bore 90. Micro-positioning translator member 54 is identical for all three bores 90 in base 12. The externally threaded portion of lower cylinder 72 screws into member 120. Preferably, translation member 54 is supported in bore 90 in a manner allowing axial sliding movement, while substantially preventing or limiting rotation, of the translation member. For instance, base 12 may have axial slots that extend the full length of the bore 90. Ears in the translator base 73 hold the translation member 54 against rotary movement.

Manual displacement subassembly 56 is connected to translation member 54 to move the translation member upwards and downwards within bore 90. Coarse adjustment means 74 of subassembly 56 is provided to move member 54 upward and downward at a relatively faster speed, and fine adjustment means 76 of subassembly 56 is provided to move member 54 upward and downward at a relatively slower speed.

More specifically, the embodiment of displacement subassembly 56 shown in the drawings includes coarse adjusting member 116, fine adjusting member 120, locking pins 122 and connecting plug 124. Coarse adjusting member 116 includes tubular upper and lower portions 116a and 116b and an interconnecting flange portion 116c. Tubular portions 116a and 116b are substantially coaxial, and lower tubular portion 116b has a diameter substantially larger than the diameter of upper portion 116a. Flange portion 116c is connected to and extends between portions 116a and 116b, and preferably portions 116a, 116b and 116c are integrally connected together. Also, preferably tubular portion 116b has external graduation on the outer face. Both the inside and outside surfaces of upper tubular portion 116 are threaded; and, in assembly, upper tubular portion 116a is threaded onto mating threads formed on the surface of lower bore portion 90c.

Fine adjusting member 120 has a generally tubular shape, including upper portion 120a, central portion 120b and lower portion 120c, and preferably member 120 further includes an annular flange portion 120d connected to and radially extending outward from central portion 120b. Also, preferably, portions 120a, 120b, 120c and 120d of fine adjusting member 120 are all integrally connected together, and both the inside and outside surfaces of upper portion 120a are threaded. The outside threads of upper portion 120a mate with the inside threads of upper portion 116a of member 116, and upper portion 120a is threaded into upper portion 116a. At the same time, the inside threads of upper portion 120a mate with the outside threads of lower cylinder 72 of translation member 54, and upper portion 120a is threaded onto that lower cylinder 72.

Locking pins 122 are used to selectively lock members 116 and 120 together for rotary movement together. More specifically, locking pins 122 extend through openings in the sidewalls of central portion 120b of member 120, and pins 122 are moveable between locking and unlocking positions. In the locking positions, pins 122 are held in a tight pressure engagement against the inside surface of member 116, and this pressure engagement causes members 116 and 120 to rotate together, about axis 90a, whenever a rotary force is applied to either one of these members 116 and 120. In the unlocking position, pins 122 are released from this tight pressure engagement against the inside surface of member 116, allowing member 120 to rotate independent of member 116. Preferably, locking pins 122 are supported by the tubular sidewall of member 120 for movement toward and away from the inside surface of member 116, and pins 122 are so moved in order to move the pins into the locking and unlocking positions respectively.

Locking plug 124 is provided to move pins 122 between their locking and unlocking positions. More specifically, locking plug 124 includes upper, tapered portion 124a and lower, threaded portion 124b. Plug 124 extends into the interior of member 120, with upper tapered portion 124a locking pins 122 and with lower threaded portion 124b of the locking plug 124 threaded onto the internal threads of lower portion 120c of member 120.

With this arrangement, plug 124 may be moved upward and downward inside member 120 by rotating the locking plug 124 therein. As plug 124 moves upward, outside surface 124c slides upwards past pins 122 and forces these pins outward into tight pressure engagement with the inside surface of member 116. As plug 124 moves downward, outside surface 124c also slides downward, and pins 122 are able to move inward, away from the inside surface of member 116, releasing pins 122 from their locking engagement with member 116.

Biasing subassembly 60 is used to urge frame 36 downwards so that, when translation member 54 moves downward, this frame, and second optical member 16, also move downward. The embodiment of subassembly 60 shown in the drawings comprises plug 80 and spring 82. Plug 80 is secured in the upper portion 90a of bore 90 and forms upwardly extending socket 80a. Spring 82 is disposed in socket 80a and extends downward therefrom and into engagement with frame 36, specifically an upper surface of tab portion 104a. With this arrangement, spring 82 urges frame 36 downward and thereby also urges second optical member 16 downward. Preferably, plug 80 is releasably held in bore 90; and, for example, as particularly illustrated in FIG. 4, plug 80 may be threaded in that bore.

Coil springs 82 may be changed, shimmied or even removed, as dynamic fine tuning dictates. Shims may be easily placed above springs 82 and inside the bore of retaining plugs 80. Parallel washers may be used as shims to adjust the preload of coil springs 82, and the spring constant of springs 82 may be changed by replacing the coil springs.

Either coarse or fine adjustment means 74 or 76 may be used to move second optical member 16 up or down inside base 12. To use the coarse adjustment means to move second optical member 16, members 116 and 120 are locked together—using locking plug 124 and locking pins 122—and member 116 is rotated. As member 116 rotates, member 120 also rotates, and the engagement of threads 120e against threads 72a forces threaded lower cylinder 72 upward or downward in bore 90. Upward movement of lower cylinder 72 is transmitted to second optical member 16 via mounting subassembly 62. When lower cylinder 72 moves downward, spring 82 forces second optical member 16 downward with the cylinder.

To use the fine adjustment means 76 to move second optical member 16, members 116 and 120 are unlocked, allowing member 120 to rotate within member 116, locking means 84 is then engaged, and member 120 is then rotated. As member 120 rotates, the engagement of threads 120e against threads 72a forces threaded lower cylinder 72 upward or downward in bore 90. Upward movement of lower cylinder 72 is transmitted to second optical member 16 via mounting subassembly 62; and as cylinder 72 moves downward, spring 82 forces second optical member 16 downward with the cylinder. Since translators 54 have much more limited travel than do coarse, or manual, adjustors 74, these manual adjustors may be used for positioning optical member 16 into its desired range of motion. Fine adjusters 76 may then be used to move optical member 16 across its range of motions, or to locate that optical member in a specific position in that range.

Moreover, the translation of member 54 may be quantified, per turn of adjustors 74 and 76, as the difference between the thread pitch of the member 120 and the thread pitch of bore 92. For fine adjustment, locking pins 84 are applied and locking pins 122 are released. This allows the manual fine adjuster knob 120 to translate the corresponding tab 104a by the difference between the inner and outer thread pitches 120e and 116e on a per turn basis. The adjuster can be graduated in convenient units if the difference in the thread pitches of the adjustors is chosen properly. For instance, the course adjuster 74 may have a differential pitch thread of 1000 microns per turn, and fine adjustor 76 may have a differential pitch thread of 50 microns per turn.

Any suitable arrangement may be used to rotate members 116 and 120. For instance, these members may be rotated by hand. Alternatively, motors (not shown) such as stepper motors, may be connected to members 116 and 120 to rotate these members. In addition, these motors may be remotely controlled, allowing interferometer 10 to operate at any location, such as on a space craft, remote from a human operator. Also, these motors may be controlled in response to signals representing the distance between members 14 and 16. The piezo-electric (or other type) micro-translators in the upper cylinder 70 can then be utilized within the limits of their travel at any preset location, including a starting point of zero spacing between members 14 and 16.

Mounting subassemblies 62, 64 and 66 are generally similar, and these subassemblies are of the type referred to as cone/vee/flat mounts. Each of these subassemblies 62, 64 and 66 includes a respective mounting member 106, 110, 112. Mounting member 106 is a mounting block forming a hollow, semi-spherical top socket or recess, mounting member 110 is a mounting member forming a v-shaped groove, and mounting member 112 has a generally flat top surface 112a. Each of the mounting members 106, 110 and 112 is mounted on the translation member 54 of a respective one of the translation assemblies 46, 50, 52. Specifically, mounting member 106 is threaded onto the top of translation member 54 of translation assembly 46; and mounting members 110 and 112 are mounted on the heads of bolts or screws that, in turn, are threaded onto the tops of translation members 54 of translation assemblies 50 and 52.

Figure 5:
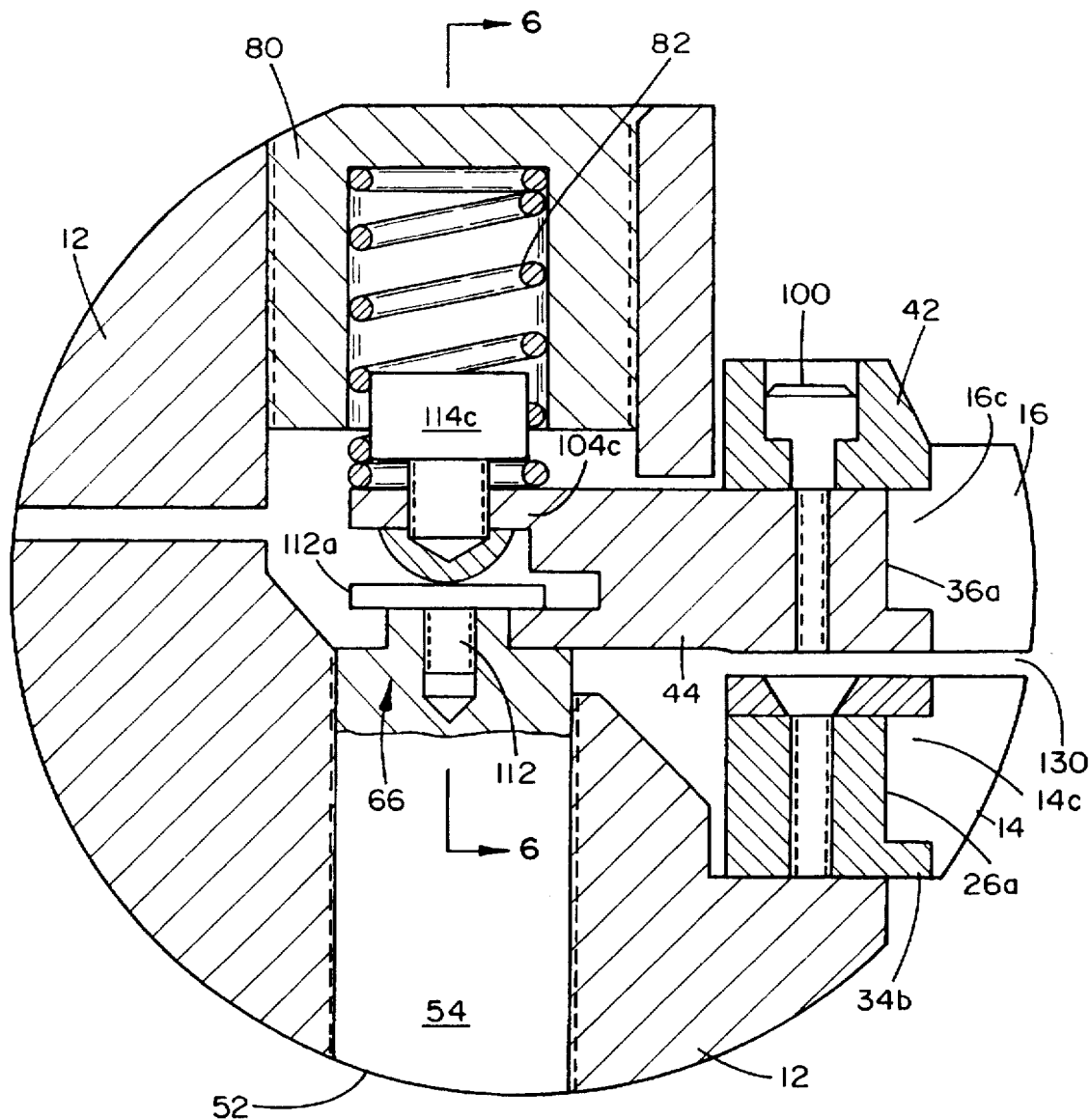
FIG. 5 is an enlarged, cross-sectional view of a part of the interferometer, taken along line 5—5 of FIG. 2.
Figure 6:
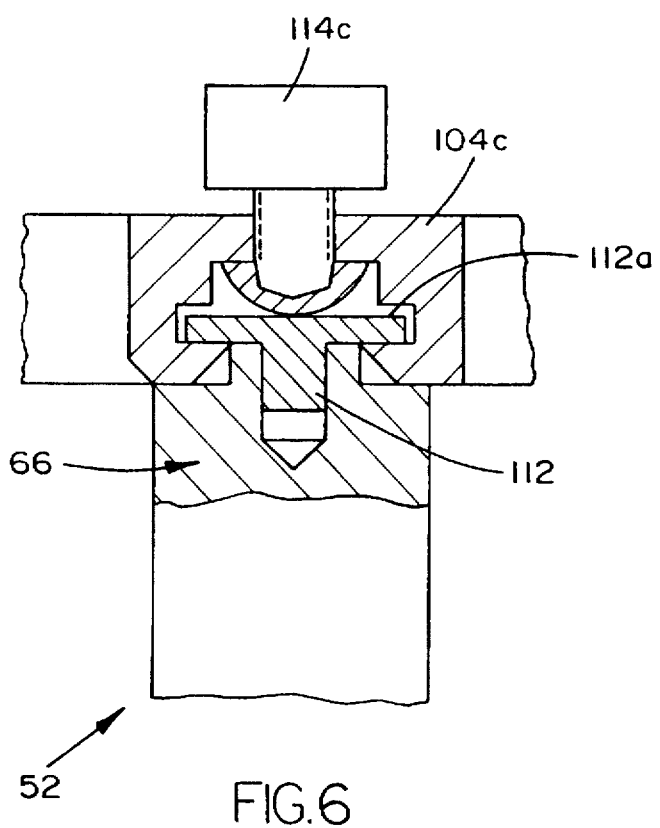
FIG. 6 is another enlarged, cross-sectional view of the part of the interferometer shown in FIG. 5, taken along line 6—6 thereof.

Mounting screws 114a, 114b and 114c are threaded through tab portions 104a, 104b and 104c of frame 36 and into engagement with mounting members 106, 110 and 112. More specifically, screw 114a is threaded through tab portion 104a and extends into the socket of mounting member 106, screw 114b is threaded through tab portion 104b and extends into v-shaped groove of mounting member 110, and screw 114c is threaded through tab portion 104c and is supported for sliding movement along the top surface 112a of mounting member 112. Belleville springs may be located beneath mounting screws 114a, 114b and 114c; and as shown in FIG. 5, a cap 115 may be placed on the lower end of screw 114c to facilitate sliding movement of the screw over surface 112a.

With the above-described mounting system, optical member 16 is securely connected to translation means 24 so that the translation means can be effectively employed to move the optical member in a controlled, precise manner. At the same time, the mounts do not impart any appreciable strain to the optical materials during positioning, and the translators do not receive any shear or bending stress. In addition, the components of the translators are retained rigidly, yet they are tuneable for wide bandwidth operation.

Also, with the preferred cone/vee/flat mounts, in case optical member 16 or base 12 thermally expand, the mounting system holds optical member 16 parallel to optical member 14 and without inducing any strain in optical member 16. To elaborate, in case of relative lateral movement between optical member 16 and base 12 due to unequal thermal expansion of these two items, mounting member 106 holds mounting screw 114a in a substantially fixed position relative to the mounting member 106. However, mounting screw 114c and plate tab 104c are able to slide over the top surface 112a of mounting member 112, and mounting screw 114b is able to slide along the v-shaped groove of mounting member 110. This ability of mounting screws 114b and 114c to move along mounting member 110 and mounting member 112 allows optical member 16 to expand and to contract while keeping optical surface 16a parallel to optical surface 14a of the optical member 14. For larger thermal changes, temperature compensated optical mounts may be utilized.

Locking means 84 is provided to lock members 116 in place and to prevent rotation of these members about their respective axes. Preferably, locking means 84 comprises a ring rotatable mounted on base 12 and extending around and immediately adjacent an outside portion of each member 116, specifically upper portions 116a thereof. Locking means 84 is rotatable mounted on base 12, for pivotal movement about an axis that is slightly spaced from the axis 12a of base 12. Thus, by rotating locking means 84, the locking means can be moved closer or away from members 116.

To lock members 116 in place, the ring of locking means 84 is rotated to bring the ring into tight pressure engagement with each of the members 116, preventing those members from rotating about their own respective axes. To unlock members 116, the ring of locking means 84 is rotated to move the ring away from members 116, reducing or eliminating the pressure engagement between the ring of locking means 84 and members 116 and allowing those members to rotate about their respective axes. Pins 126 may be inserted through the ring of locking means 84 and into openings in the bottom of base 12 to hold the ring in a given position, such as its locking position.

As mentioned above, optical member 16 is in a fluid tight engagement with shoulder portion of base 12, and seal forms a gas-tight seal between optical member 14 and the inside surface of the base. In this way, base 12 and optical members 14 and 16 form a sealed, gas cavity or chamber 130 extending between those optical members. Gases having different damping properties and indices of refraction may be introduced into cavity between the optical flats through commercially available fittings (not shown). By selecting an appropriate gas for cavity 130, an operator can slightly change the index of refraction in that cavity.

It should be noted that, for the sake of simplicity, instrument 10 has been shown in FIGS. 2 and 3 with excess material between translation cylinders 54. In practice, as previously mentioned, it may be desirable to have much more material removed from housing 12 by additional machining operations in order to minimize the weight of interferometer 10, while the functioning and configuration of the instrument would remain basically unchanged.

Interferometer 10 has a compact size, is able to obtain fast switching times without aberrations, is also able to achieve short path scanning at low orders, and employs an adjustable spring pressure. Base 12 completely encapsulates all of the moving components and isolates them from shear or bending forces. This, among other advantages, produces a ruggedized design and maintains the relative geometric position of components at all times, regardless of external loading. In addition, the interferometer forms a sealed interference cavity, allowing for dust-free operations, and the interferometer has adjustable damping properties. The microadjusting translators may be remotely operated, and the positional feedback data provided by the interferometer allows for accurate positioning of the optical surfaces. The range settings of the interferometer also are manually adjustable. Moreover, the preferred design of the interferometer avoids the need for temperature control and low frequency mechanical isolation, but allows for incorporation of these features based upon application.

Of particular importance is the present inventions ability to provide for short path scanning due to the unique retainer assemblies which allow the optical members to come close enough to actually contact each other while still being positively captured. Also of importance are the unique electromechanical features discussed above which contribute to the short path scanning capabilities of the interferometer.

The combination of durability, short path scanning capabilities, wide bandwidth and rapid scanning properties provide the interferometer 10 with substantial versatility. In particular, the interferometer may be provided with an extremely rugged, durable design that is ideal for aircraft or space applications. Interferometer 10 can be used as an optical filter for ground or aerospace applications. Additionally, as part of a larger spectral analysis system, the interferometer can be used for many purposes such as non-intrusive identification of gases, gas flow velocity measurement and temperature measurement. Further, these measurements may be made at large distances from the objects or subjects being measured.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

We claim:

1. A short path scanning interferometer comprising:

a base forming an interior;

a first optical member located in the interior of the base;

a first retainer assembly connecting the first optical member to the base;

a second optical member located in the interior of the base at a distance from the first optical member; and translation means for moving the second optical member relative to the first optical member to vary said distance between a minimum spacing of zero to a maximum spacing thereby allowing short path scanning over a wide optical bandwidth; and a second retainer assembly connecting the second optical member to the translation means.

2. The short path scanning interferometer according to claim 1, wherein:

the first retainer assembly includes
i) a frame, and
ii) means rigidly connecting the frame to the base; and the first optical member is rigidly connected to the frame.

3. The short path scanning interferometer according to claim 2, wherein:

the base forms an inside shoulder portion;

the frame is mounted on and is supported by the inside shoulder portions; and the connecting means rigidly connects the frame member to said inside shoulder portion.

4. The short path scanning interferometer according to claim 2, wherein:

the frame forms a peripheral groove; and the first optical member extends into and is securely clamped in said peripheral groove.

5. The short path scanning interferometer according to claim 1, wherein:

the second retainer assembly includes
i) a frame, and
ii) means connecting the frame to the translation means for movement with the translation means; and
the second optical member is connected to the frame for movement therewith.

6. The short path scanning interferometer according to claim 5, wherein:

the translation means supports the frame for upward and downward sliding movement; and the second optical member is connected to the frame for upward and downward sliding movement therewith.

7. The short path scanning interferometer according to claim 6, wherein:

the frame forms a peripheral groove; and the second optical member extends into and is securely clamped in said peripheral groove.

8. The short path scanning interferometer according to claim 1, wherein:

the translation means includes a plurality of translation assemblies supported by and spaced around the base; and each of the translation assemblies is connected to the second optical member to move the second optical member relative to the first optical member.

9. The short path scanning interferometer according to claim 1, wherein:

the translation means includes
i) a translation member supported for upward and downward movement relative to the base, and
ii) a displacement means connected to the translation member to move said translation member upward and downward; and
the second retainer assembly connects the second optical member to the translation member.

10. The short path scanning interferometer according to claim 9, wherein:

the base forms a bore;

the translation member is supported for upward and downward sliding movement in the bore;

the translation member includes a threaded portion; and the displacement means includes a threaded sub-assembly rotatably supported in the bore and threaded onto the threaded portion of the translation member, wherein rotation of the threaded sub-assembly moves the translation member upward and downward.

11. The short path scanning interferometer according to claim 9, wherein the translation means further includes a biasing subassembly connected to the bore, engaging the second retainer assembly and urging the second retainer assembly into engagement with the translation member to facilitate moving the second retainer assembly with the translation member.

12. The short path scanning interferometer according to claim 1, wherein the first and second optical members are spaced apart and form a chamber therebetween; and the base defines a fluid inlet in communication with said chamber to conduct a gas thereinto.

13. The short path scanning interferometer according to claim 12, wherein:

the first retainer assembly and the base form a first gas seal on a first side of said chamber; and the second retainer assembly and the base form a second gas seal on a second side of said chamber.

14. The short path scanning interferometer according to claim 1, wherein the translation means incorporates macro and micro adjusting capabilities and can operate over a wide bandwidth.

15. The short path scanning interferometer according to claim 1, wherein the translation means incorporates micro-positioning translators which are contained integrally in the base.

16. The short path scanning interferometer according to claim 15, wherein the second retainer assembly is mounted on the translators by means of a precision mounting system which does not transfer bending forces to the translators.

17. The short path scanning interferometer according to claim 1, wherein the second optical member, the second retainer assembly and the translation means include moveable components, and the base substantially encapsulates all said movable components to isolate said moveable components from shear and bending forces.

18. The short path scanning interferometer according to claim 1, wherein the second retainer assembly provides 360° constraint of the second optical member to facilitate moving the second optical member without causing strain induced optical aberrations.

19. The short path scanning interferometer according to claim 15, wherein the micro-positioning translators are piezo-electric translators.

20. A method of operating a short path scanning interferometer, comprising a base forming an interior, first and second optical members located in said interior, and a translation member supported by the base and engaging the second optical member, the method comprising:

sliding the translation member upward and downward to move the second optical member relative to the first optical member to vary a distance between the first and second optical members between a minimum spacing of zero to a maximum spacing thereby allowing short path scanning over a wide optical bandwidth.

21. The method according to claim 20, wherein the short path scanning interferometer further comprises a threaded subassembly mounted on the translation member, said threaded subassembly including an inner tubular member mounted on the translation member and an outer tubular member mounted on the inner tubular member, and wherein the sliding step includes the steps of:

rotating the inner tubular member about the translation member to slide the translation member upward and downward at a first rate; and rotating the outer tubular member about the tubular member to slide the translation member upward and downward at a second rate, greater than the first rate.

22. The method according to claim 21, wherein the step of rotating the outer tubular member includes the step of locking the inner and outer tubular members together for unitary rotation.

23. The method according to claim 20, wherein the first and second optical members are spaced apart, and further comprising:

conducting a gas into the space between the first and second optical members to vary the index of refraction of said space.

* * * * *